United States Patent [19]

Lee

[11] Patent Number: 4,638,884

[45] Date of Patent: Jan. 27, 1987

[54] CHAMBERED HEADREST MOUNTING FOR STEREOPHONIC LOUDSPEAKERS

[75] Inventor: James Lee, 2115 Mission, Spokane, Wash. 99201

[73] Assignees: Willis S. Cole, Seattle; James Lee, Vancouver; Rob Wortman; Claude Frabel, both of Lynnwood, all of Wash.

[21] Appl. No.: 754,496

[22] Filed: Jul. 11, 1985

[51] Int. Cl.⁴ .............................................. H05K 5/00
[52] U.S. Cl. .................................... 181/141; 181/146; 181/153; 181/156; 381/86; 381/25; 381/159
[58] Field of Search ............... 181/141, 146, 151, 153, 181/156; 179/146 E, 146 H, 179, 150, 151; 381/86

[56] References Cited

U.S. PATENT DOCUMENTS

| | | |
|---|---|---|
| 3,512,605 | 5/1970 | McCorkle ........................... 181/141 |
| 3,944,020 | 3/1976 | Brown ................................. 181/141 |
| 4,042,791 | 8/1977 | Wiseman .......................... 181/141 X |
| 4,127,751 | 11/1978 | Kinoshita ........................ 181/151 X |
| 4,549,631 | 10/1985 | Bose ................................. 181/156 X |

Primary Examiner—Benjamin R. Fuller
Attorney, Agent, or Firm—Ward Brown; Robert W. Beach

[57] ABSTRACT

A headrest hollow casing has a central vented chamber connecting end chambers in which stereophonic loudspeakers are mounted and such central chamber is loosely filled with batting or other sound-damping material. The casing is supported by mounting rods or mounting bar angularly adjustable relative to the casing.

10 Claims, 6 Drawing Figures

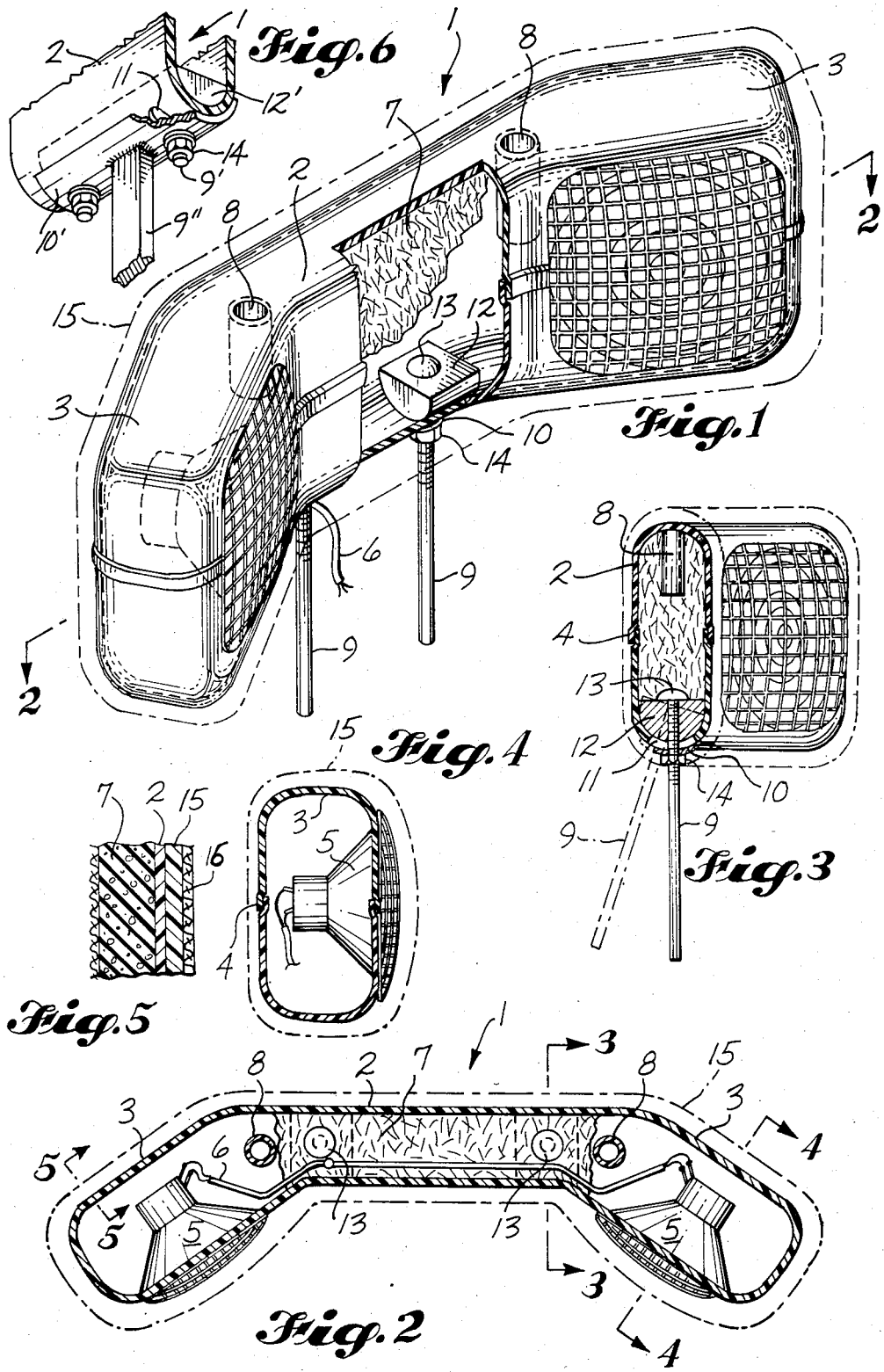

CHAMBERED HEADREST MOUNTING FOR STEREOPHONIC LOUDSPEAKERS

BACKGROUND OF THE INVENTION

1. Field of the Invention

This invention relates to a headrest mounting for stereophonic loudspeakers providing a chamber connecting the chambers in which the loudspeakers are mounted.

2. Prior Art

A representative headrest in which stereophonic loudspeakers have been mounted is shown in U.S. Pat. No. 3,512,605, issued May 19, 1970. Such headrest was intended primarily for use in an automobile.

SUMMARY OF THE INVENTION

A principal object of the present invention is to provide an installation of stereophonic loudspeakers in a headrest suitable for use in automobiles which will afford greater timbre and richness of sound reproduction than obtained by previous stereophonic speakers carried by a headrest.

A further object is to provide a stereophonic speaker headrest, the position of which can be adjusted easily.

These objects can be obtained by incorporating in a headrest a chamber connecting the chambers in which the loudspeakers are mounted, which connecting chamber has one or more vents. The headrest can be mounted for tilt adjustment relative to its support.

BRIEF DESCRIPTION OF THE DRAWINGS

FIG. 1 is a top perspective of a chambered headrest mounting for stereophonic loudspeakers in accordance with the present invention with parts broken away.

FIG. 2 is a horizontal section taken on line 2—2 of FIG. 1.

FIG. 3 is a vertical section taken on line 3—3 of FIG. 2.

FIG. 4 is a vertical section through the headrest taken on line 4—4 of FIG. 2.

FIG. 5 is a fragmentary detail section through a portion of the wall structure of the headrest of FIG. 1.

FIG. 6 is a fragmentary bottom perspective of the lower central portion of the headrest showing a modified type of mounting structure with parts broken away.

DETAILED DESCRIPTION

Stereophonic reproduction of music requires the use of two speakers which are placed a considerable distance apart for best results. Where stereophonic speakers are mounted in a headrest, however, the possible spacing between the speakers is limited. Consequently, in the past the most desirable stereophonic reproduction has not been obtained.

An improved stereophonic reproduction of music is obtained by the headrest-mounted loudspeakers in the present invention by providing a chamber in the headrest connecting the chambers in which the stereophonic speakers are mounted.

The body of the headrest 1 is formed principally of a hard casing or shell of plastic including a spreader or bridging hollow central portion 2 carrying at its opposite ends hollow wings 3 angled forward relative to the bridging portion of the headrest so that the back of the user's head can engage the central spreader portion of the headrest generally between the angled wings.

While the central portion 2 of the headrest casing can be any selected one of various shapes, it is preferred that, as shown in FIG. 3, the central portion of the casing be a plurality of times as high as it is wide, and that such central portion be of generally rectangular cross section. The casing can be made in two halves, such as upper and lower halves with a horizontal lap joint 4 connecting such halves together, as shown, or rear end front halves connected by a joint in a generally vertical plane.

A loudspeaker 5 of conventional type is mounted in the chamber of each wing 3 at an obtuse angle to the bridging portion 2 of the casing. The loudspeakers are connected by wires 6 to conventional radio or sound-reproducing equipment.

The portion of the chamber in the central portion of the headrest casing connecting the loudspeaker chambers contains, and preferably is substantially completely filled with, loose filler material 7 which may be in the form of a bat of polyester resin strands or glass fiber, loose pieces of rigid polystyrene foam, flexible foam or similar material which will dampen the transmission of sound waves of at least some frequencies, principally the higher frequencies, through the connecting chamber but which will not block or appreciable attenuate the transmission of the lower frequencies.

The casing is vented to the exterior of the housing by one or more tubes 8 preferably of ¼ inch (6.35 mm) or larger diameter and 2 to 4 inches (5.08 cm to 10.16 cm) in length. Preferably the tubes are upright and are of as great a length as possible without their outer ends projecting appreciably beyond the exterior of the casing. While only a single tube might prove to be adequate, it is preferred that two such tubes be provided which can be located approximately at the junctions between the opposite ends of the bridging central portion 2 and the wings 3 in which the loudspeakers 5 are mounted and have their inner ends opening into the respective speaker-mounting chambers in wings 3.

The headrest can be tilted to a desired angle about a substantially horizontal axis. To afford such adjustment, the headrest can be supported by upright mounting bars or rods 9 having threaded upper end portions extending through supporting plates or washers 10. The bottom wall of the casing central portion 2 is arcuate and has a concave interior and convex exterior. The supporting plates or washers preferably are arcuate complemental to the convex outer periphery of the bottom of the casing bridging portion 2. Such rods extend upward through anchor blocks 12 located in the lower portion of the central connecting chamber of the casing, as shown in FIG. 3, which blocks are of substantially semicylindrical shape having arcuate bottoms complemental to the concave interior of the bottom of the casing bridging portion.

The rods can be tilted relative to the casing by sliding transversely of their lengths through transverse slots 11 in the casing extending circumferentially of the arcuate casing bottom while the arcuate anchor blocks 12 and support plates or washers 10 slide on the inner and outer sides, respectively, of the arcuate bottom wall of the casing. The casing can be fixed relative to the rods in any adjusted position because the top end of each rod has a head or nut 13 on it bearing against the flat top of the block 12 and the threaded shank of the rod carries a nut 14 that can be tightened to clamp the casing between the block 12 and plate 10 after the headrest has been swung to the desired position.

A modified mounting arrangement for the headrest casing 1 is shown in FIG. 6 as including the support plate 10' which is attached to the semicylindrical anchor block 12' by bolts 9' spaced axially of such block. The structure of such bolts is similar to that of bolts 9 shown in FIGS. 3 and 4 except that they do not have a long shank. Such bolts extend through transverse slots 11 in the bottom of the casing 1. The bolts can clamp the supporting plates 10' to the casing 1 in any tilted relationship of the casing to the bolts by sliding the bolts transversely of their lengths along transverse slots 11 appropriately and then tightening the nuts 14 against the supporting plate 10'.

Instead of supporting the headrest by the shanks of bolts 9', comparable to utilizing the shanks of bolts 9 shown in FIGS. 1 and 3 to support the headrest, the headrest is supported by a mounting bar 9'' having its upper end butt-welded or otherwise fixed to the supporting plate 10' at a location between the apertures in such support plate through which the bolts 9' extend. With the mounting bar 9'' suitably attached to a seat back, the tilt of the headrest can be adjusted by loosening nuts 14, tilting the headrest relative to the supporting plate 10', as desired, and again tightening the nuts 14 to clamp the casing between the support plate and the anchor block 12'.

The exterior of the headrest casing 2, 3 can be covered with a cushion or blanket 15 of resilient foam or pad material, and such blanket in turn can be covered with a finishing layer 16 of fabric or other upholstering material.

I claim:

1. A headrest comprising a casing including a hollow central bridging portion and hollow end portions connected by said central bridging portion, stereophonic loudspeakers for different channels housed in said hollow end portions, respectively, said hollow end portions being in communication acoustically through said hollow central bridging portion, and vent means venting said casing hollow end portions to the exterior of said casing.

2. A headrest comprising a casing including a hollow central bridging portion and hollow end portions connected by said central bridging portion, stereophonic loudspeakers for different channels housed in said hollow end portions, respectively, and in communication acoustically through said hollow central bridging portion, and loose filler material in said hollow bridging portion of said casing between its hollow end portions for damping transmission of sound waves of some frequencies without appreciable attenuation of sound waves of other frequencies.

3. The headrest defined in claim 2, in which the loose filler material substantially fills the central bridging portion of the casing between its hollow end portions.

4. The headrest defined in claim 3, in which the filler material includes fibrous bat material.

5. The headrest defined in claim 3, in which the filler material includes flexible foam material.

6. The headrest defined in claim 3, in which the filler material includes small pieces of rigid foam material.

7. A headrest comprising a casing including a hollow central bridging portion and hollow end portions connected by said central bridging portion, stereophonic loudspeakers for different channels housed in said hollow end portions, respectively, and in communication acoustically through said hollow central bridging portion, and two vent tubes having their outer ends received in apertures in said casing, said tubes extending from said casing apertures into the respective hollow end portions of said casing.

8. The headrest defined in claim 7, in which the two vent tubes are located, respectively, at the junctions between the opposite ends of the bridging portion of the casing and its end portions.

9. A headrest comprising a casing including a hollow central bridging portion and hollow end portions connected by said central bridging portion, stereophonic loudspeakers housed in said hollow end portions, respectively, and in communication acoustically through said hollow central bridging portion, the bottom wall of said casing being arcuate and having a concave interior, and support means supporting the headrest casing for tilt adjustment about a generally horizontal axis, said support means including mounting means exteriorly of the casing, anchor means interiorly of the casing and connected to said mounting means and means for clamping said casing bottom wall between said mounting means and said anchor means, said anchor means including a convex anchor block complemental to the concave interior of said casing bottom wall for bearing thereagainst.

10. The headrest defined in claim 9, in which the arcuate bottom casing wall is slotted circumferentially, and bolts extending through said slots and connecting the mounting means and the anchor block for clamping the casing wall between the mounting means and the anchor block.

* * * * *